(12) United States Patent
Wawrzyniec et al.

(10) Patent No.: US 11,142,238 B2
(45) Date of Patent: Oct. 12, 2021

(54) TRAVEL STOP SUPPORT BUSHING

(71) Applicant: STEERING SOLUTIONS IP HOLDING CORPORATION, Saginaw, MI (US)

(72) Inventors: Dale Wawrzyniec, Midland, MI (US); Joseph B. Rombach, Bath, MI (US); George Arlt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 203 days.

(21) Appl. No.: 16/146,085

(22) Filed: Sep. 28, 2018

(65) Prior Publication Data

US 2020/0102000 A1 Apr. 2, 2020

(51) Int. Cl.
*B62D 7/22* (2006.01)
*B62D 1/19* (2006.01)
*B62D 3/12* (2006.01)
*F16B 21/16* (2006.01)

(52) U.S. Cl.
CPC .............. *B62D 1/195* (2013.01); *B62D 3/12* (2013.01); *B62D 7/22* (2013.01); *F16B 21/16* (2013.01)

(58) Field of Classification Search
CPC .......... F16B 21/08; F16B 21/10; F16B 21/16; B62D 1/195; B62D 3/00; B62D 3/12; B62D 3/126; B62D 5/0472; B62D 7/22; B62D 7/226; B62D 7/228
See application file for complete search history.

(56) References Cited

U.S. PATENT DOCUMENTS

| | | | | |
|---|---|---|---|---|
| 5,216,928 | A * | 6/1993 | Kodachi | B62D 3/12 74/422 |
| 6,588,770 | B1 * | 7/2003 | Lee | B62D 3/12 280/5.52 |
| 7,798,504 | B2 * | 9/2010 | Hirose | B62D 3/12 280/93.514 |
| 2002/0085778 | A1 * | 7/2002 | Mena | B62D 3/12 384/276 |
| 2008/0088104 | A1 * | 4/2008 | Arlt | F16C 29/002 280/93.514 |
| 2009/0000853 | A1 * | 1/2009 | Hirose | F16C 29/02 180/400 |
| 2014/0216183 | A1 * | 8/2014 | Nakayama | B62D 5/0442 74/29 |
| 2015/0274192 | A1 * | 10/2015 | Enomoto | B62D 7/226 280/93.51 |
| 2015/0274193 | A1 * | 10/2015 | Saito | F16C 29/02 74/422 |
| 2016/0059883 | A1 * | 3/2016 | Mizutani | F16C 33/20 74/422 |
| 2016/0160913 | A1 * | 6/2016 | Cooper | F16C 23/04 74/422 |
| 2017/0113719 | A1 * | 4/2017 | Ohashi | B62D 7/163 |
| 2017/0130769 | A1 * | 5/2017 | Ikeda | B62D 3/12 |

(Continued)

*Primary Examiner* — Barry Gooden, Jr.
(74) *Attorney, Agent, or Firm* — Dickinson Wright PLLC

(57) ABSTRACT

A travel stop support bushing includes a body and an extension. The body has a first outer surface that extends between a first body face and a second body face along an axis. The body defines a plurality of fins that are at least partially defined between the first outer surface and the second body face. The extension has a second outer surface that extends between the first body face and an end face.

16 Claims, 2 Drawing Sheets

(56) References Cited

U.S. PATENT DOCUMENTS

2017/0267282 A1* 9/2017 Ogata ................. F16F 3/10
2018/0297628 A1* 10/2018 Bando ................. F16C 29/02
2018/0334187 A1* 11/2018 Kato ................. B62D 7/163

* cited by examiner

TRAVEL STOP SUPPORT BUSHING

BACKGROUND

Steering gear assemblies may include a housing, a rack gear, and a tie rod. In an impact event (e.g., a vehicle striking a curb or other obstruction), the rack gear may experience loads that may force a tie rod end into the end of the housing and may cause over travel of the rack gear or deflection of the rack.

SUMMARY

Disclosed is a steering gear assembly that includes a rack, a tie rod, and a travel stop support bushing. The rack extends at least partially through a housing assembly along an axis. The tie rod is operatively connected to an end of the rack. The travel stop support bushing is disposed about the rack and is at least partially disposed within the housing assembly. The travel stop support bushing is arranged to inhibit deflection of the rack relative to the axis and limit travel of the rack along the axis.

Also disclosed is a travel stop support bushing for a steering gear assembly. The travel stop support bushing includes a body and an extension. The body has a first outer surface that extends between a first body face and a second body face along an axis. The body defines a plurality of fins that are at least partially defined between the first outer surface and the second body face. The extension has a second outer surface that extends between the first body face and an end face.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting the same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
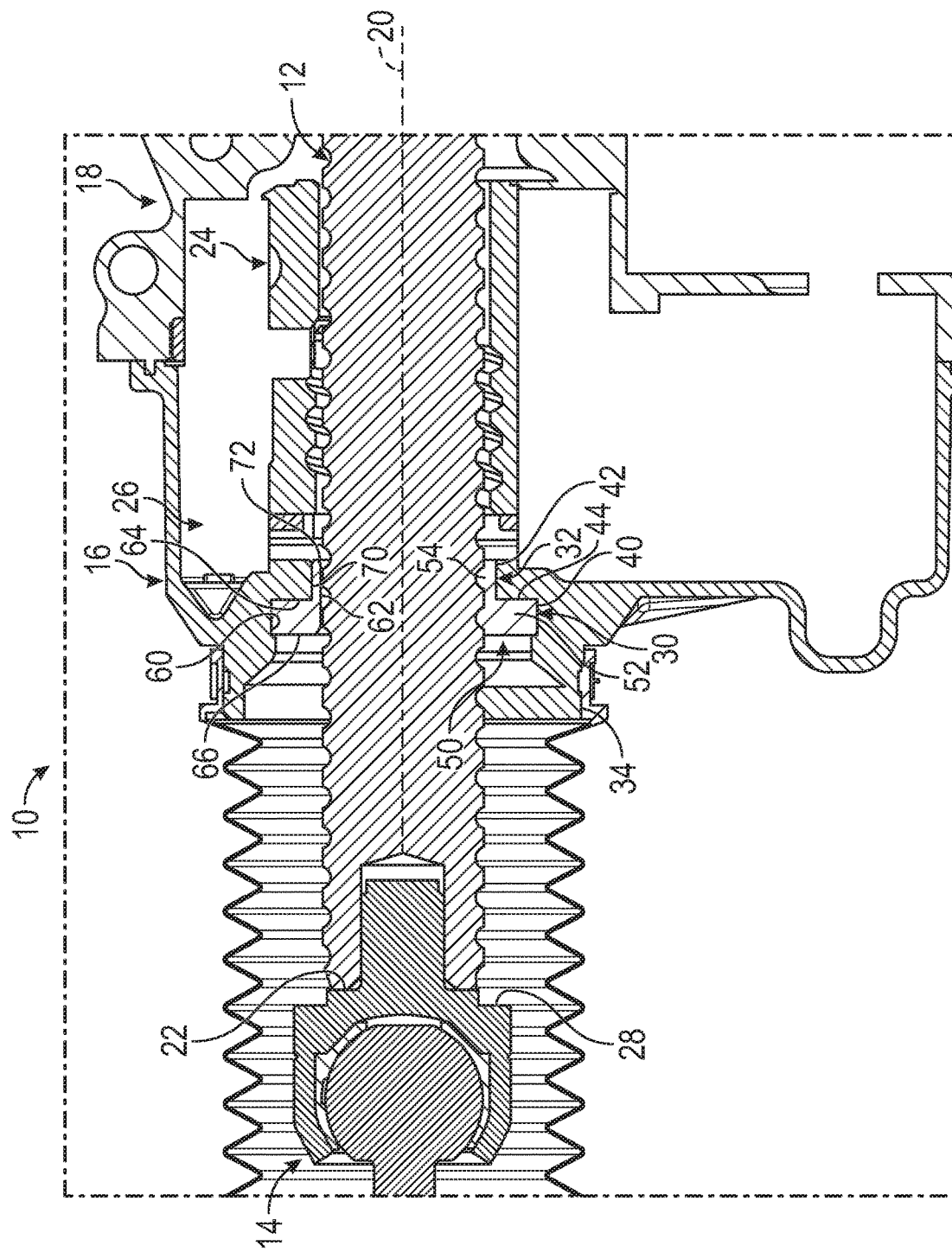
FIG. 1 is a section view of a steering gear assembly of a steering system.

Referring to FIG. 1, a vehicle may be provided with a steering system that enables the operator of the vehicle to steer the vehicle. The steering system includes a steering gear assembly 10 that is arranged to impart a steering load to various components to steer at least one steerable wheel of the vehicle. The steering gear assembly 10 includes a rack 12, a tie rod 14, a cover 16, and a housing 18.

The rack 12 is an elongated rack that extends along an axis 20. The rack 12 may be provided with teeth or engagements members that are arranged to mesh or engage with other components of the steering gear assembly 10 such as a gear, a ball nut, or the like to move the rack 12 relative to the axis 20. The rack 12 extends at least partially through the cover 16 and the housing 18 along the axis 20. The tie rod 14 is connected to at least one end 22 of the rack 12. A first end of the tie rod 14 is operatively connected to an end 22 of the rack 12. A second end of the tie rod 14, that is disposed opposite the first end of the tie rod 14, is operatively connected to another component of the steering system such as a steering knuckle.

The cover 16 is connected to the housing 18 such that the combination of the cover 16 and the housing 18 define a housing assembly or a unified housing. A power steering assist mechanism 24 is disposed within a cavity 26 defined between the cover 16 and the housing 18. The power steering assist mechanism 24 is arranged to impart a load or a steering assist load to the rack 12 that aids in the movement of the rack 12 relative to or along the axis 20 to pivot or steer at least one vehicle wheel.

The cover 16 defines a first bore or a first opening 30 and a second bore or a second opening 32 that extends from the first opening 30. The first opening 30 is disposed about the axis 20 and extends between a mounting flange 34 of the cover 16 towards the second opening 32 along the axis 20. The first opening 30 has a first cross-sectional form or cross-sectional diameter. The first opening 30 includes a first surface 40 that is disposed generally parallel to the axis 20. The second opening 32 extends from the first opening 30 towards the housing 18 along the axis 20 such that the second opening 32 is disposed coaxial with the first opening 30. The second opening 32 has a second cross-sectional form or cross-sectional diameter that is less than the first cross-sectional form of the first opening 30. The second opening 32 includes a second surface 42 that is disposed generally parallel to the first surface 40 and the axis 20. A flat or an end surface 44 extends between the first surface 40 of the first opening 30 and the second surface 42 of the second opening 32. The end surface 44 is disposed generally perpendicular to the axis 20 and the first surface 40 and the second surface 42.

The rack 12 extends through the first opening 30 and the second opening 32 of the cover 16 along the axis 20. The rack 12 is spaced apart from the first surface 40 of the first opening 30 and is spaced apart, from the second surface 42 of the second opening 32. The movement of the rack 12 relative to the first axis 20 may move the end 22 of the rack that is operatively connected to the tie rod 14 relative to the cover 16. The translation of the tie rod 14 relative to the cover may result in impacts between the tie rod 14 and the cover 16. A travel stop support bushing 50 is provided to inhibit impacts of the tie rod 14 with the cover 16, reduce shock from impacts between the tie rod 14 and the travel stop support bushing 50, limit travel of the rack 12 and the tie rod 14 along the axis 20, limit radial deflection of the rack 12 (relative to the axis 20) during impact vents, and supports the rack 12 within the housing assembly.

The travel stop support bushing 50 is disposed about the rack 12 and is arranged to engage the cover 16 of the housing assembly. The travel stop support bushing 50 is disposed within at least a portion of the cover 16 and is arranged to engage at least one of the first surface 40 of the first opening 30 and the second surface 42 of the second opening 32.

Figure 2:
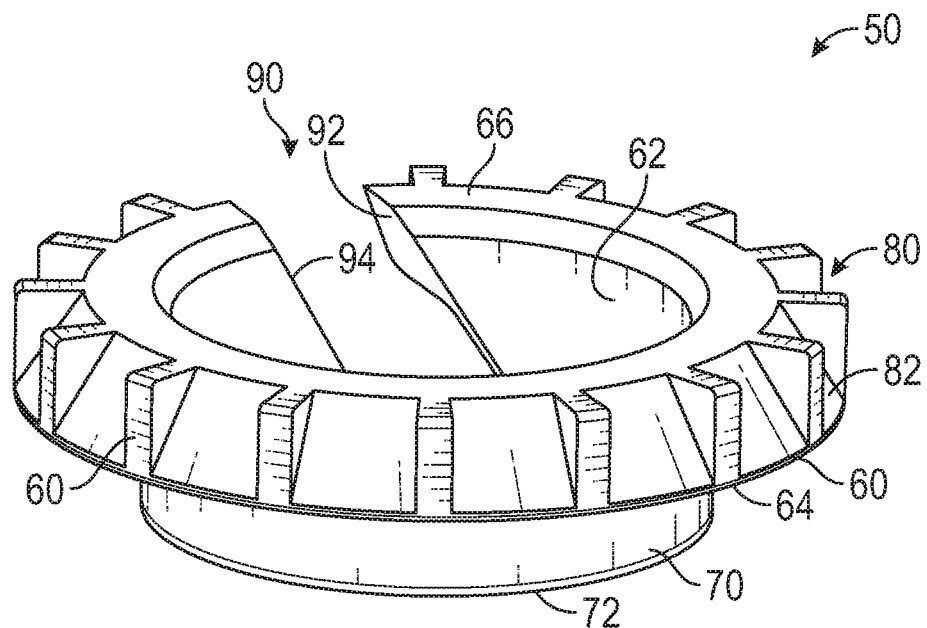
FIG. 2 is a first view of a travel stop support bushing.
Figure 3:
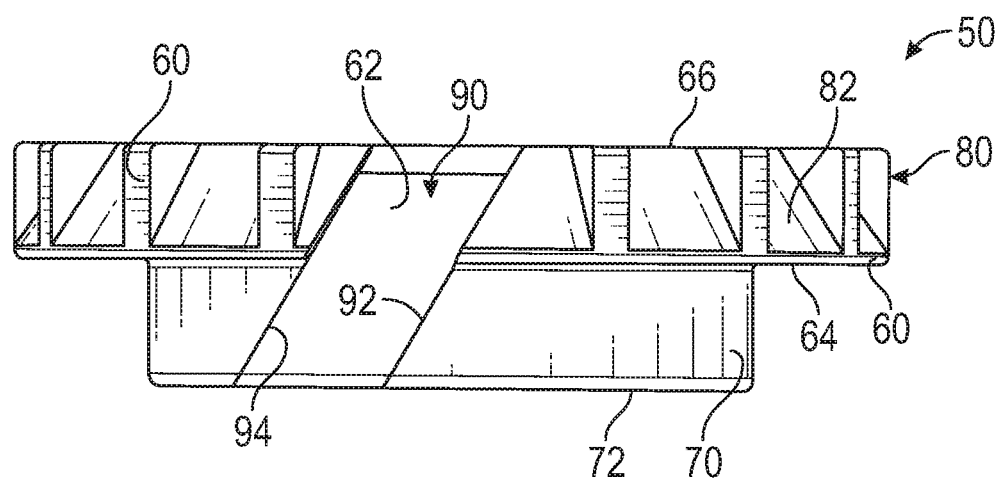
FIG. 3 is a second view of the travel stop support bushing.

Referring to FIGS. 1-3, the travel stop support bushing 50 includes a body 52 and an extension 54 that extends from the body 52 along the axis 20.

The body 52 has a first outer surface 60 and an surface 62. The first outer surface 60 extends between a first body face 64 and a second body face 66 along the axis 20. The first outer surface 60 is arranged to engage the first surface 40 of the first opening 30 of the cover 16. The first body face 64 is arranged to engage the end surface 44 of the cover 16. The second body face 66 is disposed opposite the first body face 64. The second body face 66 faces towards the tie rod 14. The tie rod 14 is arranged to engage the second body face 66 based on the tie rod 14 position relative to the housing assembly. The second body face 66 is a functional surface that is arranged to stop the rack 12 travel along the axis 20 should the tie rod face 28 contact the second body face 66. Furthermore, the body 52 of the travel stop support bushing 50 that extends between the first body face 64 and the second body face 66 is arranged to limit the rack 12 travel along the axis 20 by absorbing energy and/or acting as an axial travel stop. The second body face 66 is also arranged to increase the surface area over which the tie rod 14 may impact to absorb shock and reduce shock loading to the cover 16.

The extension 54 extends from the first body face 64 towards the housing 18 and may at least partially extend into the cavity 26. The extension 54 extends in a direction that extends from the second body face 66 towards the first body face 64 along the axis 20. The extension 54 extends into the second opening 32. The extension 54 may function as a pilot feature to facilitate the seating of the travel stop support bushing 50 within the cover 16.

The extension 54 includes a second outer surface 70 that extends between an end face 72 of the extension 54 and the first body face 64. The second outer surface 70 is arranged to engage the second surface 42 of the second opening 32. A cross-sectional form of the extension 54 is less than a cross-sectional form of the body 52.

The inner surface 62 is disposed opposite the first outer surface 60 of the body 52 and the second outer surface 70 of the extension 54. The inner surface 62 extends between the second body face 66 of the body 52 and the end face 72 of the extension 54 along the axis 20.

The inner surface 62 is an internal or inner diameter of the travel stop support bushing 50. The inner surface 62 is arranged as a functional surface that is arranged to limit the deflection of the rack 12. A radial gap is defined between the inner surface 62 and an external surface of the rack 12. The radial gap is arranged or designed to minimize radial translation of the rack 12 when a radial tie rod 14 load is applied to the inner surface 62 such that the inner surface 62 acts as a radial stop. Should more or less rack 12 radial travel be desired, the inner diameter of the travel stop bushing 50 may be increased or decreased to vary the radial gap. For example, should less radial rack travel be desired the inner diameter of the travel stop support bushing 50 would be reduced to reduce the radial gap between the inner surface 62 and the surface of the rack 12. The inner surface 62 is provided with a surface finish such that the inner surface 62 is a low friction surface that if the rack 12 comes into contact with the inner surface 62 minimal noise or friction is produced.

The body 52 of the travel stop support bushing 50 defines a plurality of fins 80. The plurality of fins 80 are at least partially defined between the first outer surface 60 and the second body face 66. The plurality of fins 80 are arranged as outwardly facing fins that facilitate or improve the flexibility of the travel stop support bushing 50. The plurality of fins 80 are arranged to engage the first surface 40 of the first opening 30 of the cover 16. The plurality of fins 80 are arranged to deflect such that the body 52 of the travel stop support busing 50 is flexible to absorb impact energy in the event of contact between the tie rod face 28 and the second body face 66.

A tapered surface 82 is defined between adjacent fins of the plurality of fins 80. The tapered surface 82 extends between the first outer surface 60 or the first body face 64 and the second body face 66. The tapered surface 82 becomes progressively closer to the axis 20 in a direction that extends from the first body face 64 and the second body face 66. The tapered surface 82 is spaced apart from the first surface 40 of the first opening 30 of the cover 16.

A split 90 is defined between circumferential end surfaces 92, 94 of the body 52 and the extension 54 that are spaced apart from each other. The split 90 extends completely through the travel stop support bushing 50. Each of the circumferential end surfaces 92, 94 radially extends, relative to the axis 20, between the inner surface 62 and at least one of the first outer surface 60 and the second outer surface 70. Each of the circumferential end surfaces 92, 94 axially extends, relative to the axis 20, between the end face 72 and the second body face 66. The split 90 is arranged to facilitate the assembly of the travel stop support bushing 50 about the cover 16. The split 90 is also arranged to facilitate the compression of the travel stop support bushing 50 relative to the cover 16.

The travel stop support bushing 50 provides an integrated part that reduces packaging space within the steering gear assembly 10 as well as provides multiple functions and benefits as described previously. The body 52 and the extension 54 of the travel stop support bushing 50 also provides error proofing for the installation of the travel support bushing 50 within the housing assembly because the body 52 is larger than the second opening 32, which inhibits the travel stop support bushing 50 from being seated within the cover 16, inhibiting the rack 12 from extending through the cover 16 and assembly of the cover 16.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering gear assembly, comprising:
  a rack extending at least partially through a housing assembly along an axis;
  a tie rod operatively connected to an end of the rack;
  a travel stop support bushing disposed about the rack and at least partially disposed within the housing assembly, the travel stop support bushing, being arranged to inhibit deflection of the rack relative to the axis and limit travel of the rack along the axis;
  wherein the travel stop support bushing comprises:
  a body having a first outer surface that extends between a first body face and a second body face along the axis; and
  wherein the body defines a plurality of fins extending circumferentially about the axis and circumferentially spaced from one another by tapered surfaces, wherein at least one of the tapered surfaces is circumferentially larger than an adjacent fin.

2. The steering gear assembly of claim 1, wherein the plurality of fins extend axially between the first body face and the second body face.

3. The steering gear assembly of claim 1, wherein the tapered surfaces become progressively closer to the axis in a direction that extends from the first body face towards the second body face.

4. The steering gear assembly of claim 1, wherein the travel stop support bushing further comprises:
an extension that extends from the first body face in a direction that extends from the second body face towards the first body face along the axis.

5. The steering gear assembly of claim 4, wherein the housing assembly includes a cover that defines a first opening disposed about the axis, a second opening disposed coaxial with the first opening, and an end surface that extends between the first opening and the second opening.

6. The steering gear assembly of claim 5, wherein the first body face is arranged to engage the end surface.

7. The steering gear assembly of claim 5, wherein the first outer surface engages a first surface of the first opening.

8. The steering gear assembly of claim 5, wherein the extension extends into the second opening.

9. The steering gear assembly of claim 5, wherein the extension includes a second outer surface that extends between an end face of the extension and the first body face, the second outer surface is arranged to engage a second surface of the second opening.

10. A travel stop support bushing for a steering gear assembly, the travel stop support bushing comprising:
a body having a first outer surface that extends between a first body face and a second body face along an axis, the body defining a plurality of fins that are at least partially defined between the first outer surface and the second body face;
an extension having a second outer surface that extends between the first body face and an end face;
a tapered surface that tapers along the axis and is defined between adjacent fins of the plurality of fins.

11. The travel stop support bushing of claim 10, wherein the tapered surface extends between the first body face and the second body face.

12. The travel stop support bushing of claim 10, wherein the tapered surface becomes progressively closer to the axis in a direction that extends from the first body face towards the second body face.

13. The travel stop support bushing of claim 10, wherein the body has an inner surface disposed opposite the first outer surface and the second outer surface, the inner surface extending between the end face and the second body face along the axis.

14. The travel stop support bushing of claim 13, wherein a split is defined between circumferential end surfaces of the body and the extension.

15. The travel stop support bushing of claim 14, wherein each of the circumferential end surfaces radially extends between the inner surface and at least one of the first outer surface and the second outer surface and each of the circumferential end surfaces axially extend between the end face and the second body face.

16. The travel stop support bushing of claim 14, wherein the split is not parallel to the axis.

* * * * *